Patented July 29, 1947

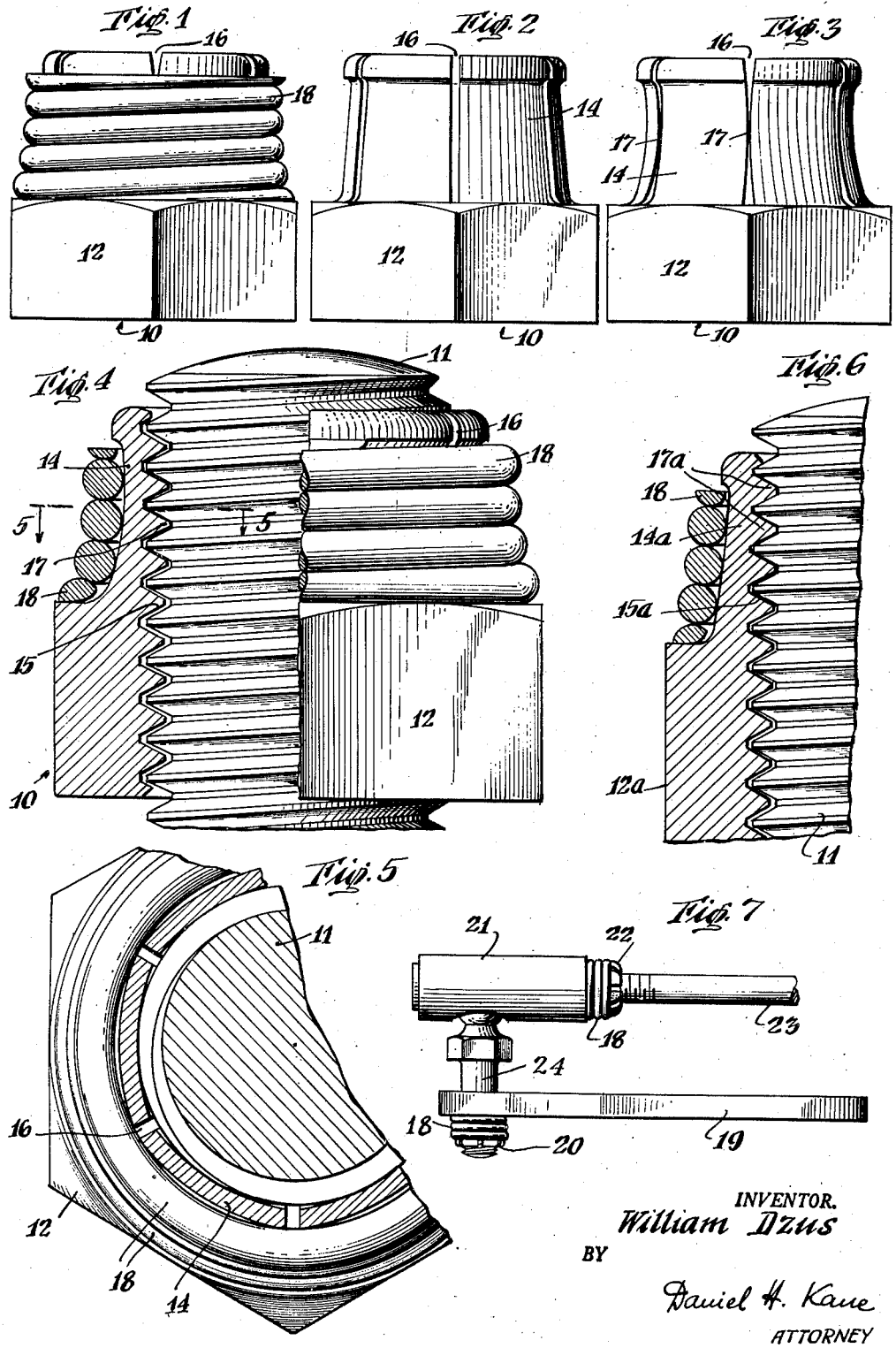

2,424,604

UNITED STATES PATENT OFFICE 2,424,604

FASTENING MEANS

William Dzus, West Islip, N. Y.

Application February 24, 1945, Serial No. 579,515

4 Claims. (Cl. 151—21)

This invention relates to fastening means of the threaded type such as a nut and it is an object of the invention to provide improved fastening means of the self-locking type.

The lock nuts heretofore available have had certain well recognized disadvantages, thus some of them have required the use of cotter pins or wiring to hold them in place and this complicates the job of applying and removing the nut and makes it difficult, and in some cases, impossible to properly adjust the nut. Other lock nuts of the self-locking type are formed with a metallic shell having a fiber or plastic insert. The insert is adversely effected by heat, excessive dryness and certain liquids such as oil. Also, nuts of this character cannot be repeatedly applied and removed without substantial loss of locking torque. Other varieties of lock nuts depend upon thread misalignment or jamming of the threads to provide the locking characteristic, and it will be appreciated that this results in damage to the thread, particularly to the thread lead of the bolt or screw to which the nut is applied. Other available self-locking nuts have one or more recognized disadvantages, as for instance, they cannot effectively withstand vibration or vibration shocks; they are adversely effected by heat, atmospheric conditions or certain liquids which are encountered in use; or they deteriorate with age or repeated usage.

It is the object of the present invention to overcome the difficulties heretofore encountered and to provide an improved threaded fastening device of the self-locking type which eliminates the use of wiring or cotter pins, which will effectively withstand vibration, which can be repeatedly removed and reused without impairment of structure or function, which is not adversely effected by relatively high temperatures, atmospheric conditions or liquids, such as oil, and which does not damage the thread of the stud or bolt to which it is applied.

A further object is the provision of improved fastening means of the above character which is of simple yet sturdy construction and is relatively inexpensive to manufacture.

My invention contemplates the provision of fastening means having a threaded opening extending therethrough and having an expansible and contractible portion normally held by resilient or yielding means in at least partly contracted position, the portion of the opening which extends through the expansible and contractible portion presenting a longitudinally convex surface. I have found that by providing the threaded opening with a longitudinally convex surface through the expansible and contractible portion, improved locking characteristics are obtained.

For a fuller understanding of the invention, reference should be had to the accompanying drawing in which:

Fig. 1 is a side elevational view of one form of fastening means embodying my invention;

Figs. 2 and 3 are side elevational views of nut blanks showing two successive steps in the manufacture of fastening means of the type shown in Fig. 1;

Fig. 4 is an enlarged fragmentary view of the fastening means shown in Fig. 1 illustrating it as applied to a bolt and showing the manner in which it is shaped or formed to produce the desired locking characteristic;

Fig. 5 is a sectional view in the directions of the arrow on line 5—5 of Fig. 4;

Fig. 6 is an enlarged fragmentary sectional view of a modified type of nut or fastening means embodying my invention; and Fig. 7 is an elevational view showing other fastening means in which my invention may be embodied.

In the first five figures of the drawing, the numeral 10 indicates a self-locking nut embodying my invention threaded to the end of a conventional type of bolt 11. The nut is provided with a body portion 12 which is of usual construction having a central internally threaded aperture extended therethrough and having any desired external shape such as square or hexagonal, as shown, to permit the application of a wrench. Projecting from the body portion at one side, and preferably, although not necessarily integral therewith, is the tubular extension or collar 14 which is concentric with the aperture in the nut and is internally threaded, as shown, the threads in the collar forming a continuation of the threads in the body portion of the nut. In this connection, it will be appreciated that any desired type of thread 15 may be employed in the nut and collar.

The tubular collar 14 is formed so as to be contractible and expansible in circumference, and for this purpose I provide the collar with longitudinal slots 16 which permit the segments of the collar to be drawn together or contracted so that the internal diameter of the aperture through the collar is less than that of the aperture through the body of the nut. In this connection, I have found that the best results are obtained by forming the collar so that the threaded opening extending therethrough presents a longitudinally convex surface. Thus the contraction of the collar is not such as to provide a true straight line taper and the final shape of the collar is not that of a true truncated cone. On the contrary, the collar is contracted in such a manner that the inner threaded wall thereof presents a longitudinally convex surface as most clearly appears in Fig. 4.

In the first form of my invention the point of maximum contraction is intermediate the two ends, as shown at 17, and the free end of the collar flares outwardly to a slight degree so that a bolt or stud may readily be threaded into the collar end of the nut. The portion of the opening, extending through the intermediate section of the collar, is smaller in diameter than the remainder of the opening so that the intermediate portion of the collar will grip the bolt when the nut is threaded thereon in the manner illustrated in Fig. 4. The collar itself will exert resilient or yielding pressure against the bolt. However, I preferably provide additional means for applying yielding or resilient pressure such as the helical spring 18 disposed around the collar.

The self-locking nut, shown in the first five figures of the drawing, may be made, as shown in Figs. 2 and 3, by first providing a nut blank having a body 12 and a collar 14, which is slotted, as shown at 16, and preferably formed with a bead at its end. The number of slots may vary. However, in the illustrated embodiment I show six slots which in turn provides six segments. A threaded opening of uniform diameter is formed through the nut body and collar. The exterior of the collar is preferably tapered to a slight degree, as shown, so that the wall thickness at the base thereof is greater than at the free end thereof providing greater strength at the point of maximum stress. After the blank is thus formed, the intermediate portion of the collar segments are curved inwardly, as shown at 17, so as to reduce the diameter of the threaded opening at that point and so that the center section of the opening through the collar is of less diameter than the remainder of the opening. The lateral edges of the individual collar segments adjacent the intermediate portion 17 flare outwardly to give an increased arc of curvature at this point, as most clearly shown in Fig. 5. This presents the advantage that a bolt having a protective finish thereon, such as cadmium plating, will not be marred or scratched by the edges of the segments as the bolt is threaded into and out of engagement therewith. After the collar has been contracted in the manner illustrated in Fig. 3, the helical spring is expanded and placed around the collar and it will be held in place by means of the bead formed around the free end of the collar.

So as to obtain the maximum resistance to heat, oil and other liquids, my improved nut is preferably made entirely of metal. Thus, the body portion and collar of the nut may be made of any material of suitable strength such as carbon or alloy steel. Under certain circumstances, however, the body portion and collar may be made of plastic or other materials. The spring 18 is preferably made of spring material.

The modified form of my invention, shown in Fig. 6, is similar to the form shown in the first five figures of the drawing, with the exception that the area of maximum contraction extends to the end of the collar, thus the nut consists of a nut body 12A, similar to the nut body 12, and formed with an integral collar 14A, which is contracted in an arcuate or curved fashion with the area of maximum contraction indicated in 17A so that the threaded internal opening presents a longitudinally convex surface. The area of maximum contraction of this form of my invention starts some distance from the free end of the collar and extends to the free end. As in the first form of my invention, a helical spring 18 is disposed around the collar so as to cause the collar to exert yielding resilient force against the bolt 11 which is threaded into the nut.

In using either the first or second form of my invention, it will be appreciated that the nut is threaded to a stud or bolt having the proper diameter and proper type of threads for the threaded opening in the body portion of the nut. The body portion is first applied to the stud, and when the stud enters the collar portion 14, it will be seen that it causes the expansion thereof against the yielding resilient force exerted by spring 18 with the result that the collar frictionally grips the stud creating sufficient torque to resist accidental rotation or loosening of the nut under vibration.

The amount of friction or torque exerted by the nut is determined by the amount of contraction of the collar and also by the size and strength of the spring applied to the collar. By increasing the amount of contraction or the strength of the spring, the torque is increased, and similarly, by decreasing the amount of the contraction of the collar or the strength of the spring, the torque is decreased. Due to the fact that the threaded opening presents a longitudinally convex inner surface, a substantial area of the collar grips the bolt whereas, if the collar were contracted and tapered to the form of a truncated cone, only the extreme free edge of the collar would grip the stud or bolt. Due to the fact that the collar in the first form of my invention flares outwardly at its free end, it will be seen that the stud or bolt may be readily introduced into the free end of the collar as well as into the body portion of the nut.

In addition to being applicable to self-locking nuts, my invention is also applicable to other fastening and adjusting means. Thus, in Fig. 7, I have shown my invention applied to a connecting and control mechanism of the type frequently employed in a motor vehicle for controlling carburetors, magnetos, etc. Thus, I have shown a control arm 19 having a threaded opening with a collar 20 surrounding the opening. The collar 20 is similar to the collar 14 and a helical spring 18 is disposed therearound. Threaded into the collar is the ball joint connector 24, the ball of which fits into a socket member 21. The member 21 in turn is formed with fastening means embodying my invention consisting of the collar 22, similar to collar 14, having spring 18 disposed therearound. Threaded into the collar is the rod 23. Due to the fact that collar 22 is similar to collar 14 and flares outwardly at the end thereof, it will be appreciated that the rod 23 may be readily introduced into the collar. It will be seen that the rod 23 may be threaded into the collar 22 to any desired adjusted position and will be held against accidental displacement. Similarly, the connector 24 may be threaded into the collar 20 to any desired adjusted position and will be held against accidental displacement.

From the foregoing, it will be seen that my invention may be embodied in various types of threaded fastening means. When embodied in a nut, it may be used in place of any type of nut and it is particularly useful in those places where vibration is encountered. It will be appreciated that fastening means embodying my invention can be removed and reused repeatedly without impairment of function or structure and without decreased in torque. It will also be seen that my fastening means will not injure the threads of the stud or bolt to which it is applied and it can withstand high temperatures, adverse atmospheric conditions, oil and similar liquids.

Modifications can be made in the illustrated and described embodiment of my invention without departing from the invention as set forth in the accompanying claims.

I claim:

1. A threaded locking device comprising a body member formed with a collar projecting therefrom and having a continuous threaded opening extending through the collar into the body member, the collar being formed with longitudinal slots providing a plurality of resilient segments surrounding the opening whereby the collar is expansible and contractible, and the collar segments being curved inwardly in a longitudinal direction intermediate their ends so that the center section of the threaded opening of the collar is of less diameter than the remainder of the threaded opening.

2. A threaded locking device comprising a body member formed with a collar projecting therefrom and having a continuous threaded opening extending through the collar into the body member, the collar being formed with longitudinal slots providing a plurality of resilient segments surrounding the opening whereby the collar is expansible and contractible, and the collar segments being curved inwardly in a longitudinal direction intermediate their ends so that the center section of the threaded opening of the collar is of less diameter than the remainder of the threaded opening, and a spring disposed around said collar and arranged to exert force against the collar segments normally to maintain them in the said inwardly curved relationship.

3. A lock nut comprising a nut body formed with a collar projecting therefrom and having a continuous threaded opening extending through the collar and nut body, the collar being formed with longitudinal slots providing a plurality of resilient segments surrounding the opening whereby the collar is expansible and contractible, and the collar segments being curved inwardly in a longitudinal direction intermediate their ends so that the center section of the threaded opening of the collar is of less diameter than the remainder of the threaded opening, and a helical spring disposed around said collar and arranged to exert force against the collar segments normally to maintain them in the said inwardly curved relationship.

4. In the method of making a threaded locking device, the steps which comprise first forming a body member with an integral reduced axial collar slotted to define resilient segments and with threads extending through the collar into said body member and then permanently deforming the segments so that they curve inwardly in a longitudinal direction intermediate their ends so that the center section of the collar is of less diameter than the remainder of the collar and so that the center sections of the collar segments have a relatively increased arc of curvature in a transverse direction.

WILLIAM DZUS.

REFERENCES CITED

The following references are of record in the file of this patent:

UNITED STATES PATENTS

| Number | Name | Date |
|---|---|---|
| 2,290,175 | Gade | July 21, 1942 |
| 2,286,982 | Todd | June 16, 1942 |

FOREIGN PATENTS

| Number | Country | Date |
|---|---|---|
| 79,508 | Sweden | Feb. 6, 1934 |
| 764,544 | France | Mar. 5, 1934 |
| 237,809 | Great Britain | Aug. 6, 1925 |
| 547,624 | Great Britain | Sept. 3, 1942 |